US012717801B2

(12) United States Patent
Zhang et al.

(10) Patent No.: US 12,717,801 B2
(45) Date of Patent: Aug. 25, 2026

(54) POWER SYSTEM RISK ASSESSMENT METHODS AND SYSTEMS CONSIDERING DEEP FEATURE MINING UNDER EXTREME WEATHER CONDITIONS

(71) Applicants: STATE GRID HENAN ELECTRIC POWER COMPANY ELECTRIC POWER SCIENCE RESEARCH INSTITUTE, Zhengzhou (CN); HARBIN INSTITUTE OF TECHNOLOGY, WEIHAI, Weihai (CN)

(72) Inventors: Di Zhang, Zhengzhou (CN); Mingyang Liu, Zhengzhou (CN); Ze Gao, Zhengzhou (CN); Chunsun Tian, Zhengzhou (CN); Chenghao Li, Zhengzhou (CN); Ji Han, Weihai (CN); Hua Wang, Zhengzhou (CN); Guangjie Zhu, Zhengzhou (CN); Wei Liu, Zhengzhou (CN); Fangbing Liu, Zhengzhou (CN); Guanyu Zhang, Zhengzhou (CN); Xingwei Chen, Zhengzhou (CN); Xueqing Pan, Zhengzhou (CN); Zhou Fang, Zhengzhou (CN); Xiaolu Cao, Zhengzhou (CN); Hua Zhao, Zhengzhou (CN); Kun Gao, Zhengzhou (CN); Yuanyang Ma, Zhengzhou (CN); Hao Zhang, Zhengzhou (CN)

(73) Assignees: State Grid Henan Electric Power Company Electric Power Science Research Institute, Zhengzhou (CN); Harbin Institute of Technology, Weihai, Weihai (CN)

( * ) Notice: Subject to any disclaimer, the term of this patent is extended or adjusted under 35 U.S.C. 154(b) by 0 days.

(21) Appl. No.: 19/138,511

(22) PCT Filed: Oct. 11, 2024

(86) PCT No.: PCT/CN2024/124148

§ 371 (c)(1),
(2) Date: Jun. 12, 2025

(87) PCT Pub. No.: WO2025/077830

PCT Pub. Date: Apr. 17, 2025

(65) Prior Publication Data

US 2026/0079951 A1 Mar. 19, 2026

(30) Foreign Application Priority Data

Oct. 12, 2023 (CN) ........................ 202311318484.X

(51) Int. Cl.
*G06F 16/2458* (2019.01)
*G06F 16/29* (2019.01)
(Continued)

(52) U.S. Cl.
CPC .......... *G06F 16/2468* (2019.01); *G06F 16/29* (2019.01); *G06Q 10/04* (2013.01);
(Continued)

(58) Field of Classification Search
CPC ..... G06F 16/2468; G06F 16/29; G06Q 50/06; G06Q 10/0635; G06Q 10/0637; G06Q 10/04
(Continued)

(56) References Cited

U.S. PATENT DOCUMENTS

2009/0224941 A1* 9/2009 Kansal ..................... H04Q 9/00 340/870.06
2021/0203157 A1* 7/2021 Visweswariah .... G05B 23/0283

FOREIGN PATENT DOCUMENTS

CN 114547829 A * 11/2020 ............. G06Q 50/06
CN 116167609 A * 5/2023 ............... G06N 3/08
(Continued)

OTHER PUBLICATIONS

International Search Report issued on Jan. 6, 2025, in corresponding International Application No. PCT/CN2024/124148; 4 pages.

*Primary Examiner* — Shahid A Alam
(74) *Attorney, Agent, or Firm* — Maier & Maier, PLLC

(57) ABSTRACT

A method for risk assessment of a power system in extreme weather conditions considering deep feature mining for risk assessment of a power system. The risk assessment method includes: dividing the entire power system into regions
(Continued)

based on geographical locations; combining historical wind speed data to construct a correlation model for strong wind extreme weather in multiple regions of the power system; constructing a strong wind scenario sample set for each region based on the correlation model; obtaining the probability of transmission line failure in the corresponding region under each strong wind scenario in the strong wind scenario sample set; randomly assigning a power system operating condition to each strong wind scenario in each region, and obtaining the operating risk value of the power system under the corresponding operating condition; constructing and training a risk assessment model; and using the model to provide a power system operating risk score assessment.

9 Claims, 7 Drawing Sheets

(51) Int. Cl.
*G06Q 10/04* (2023.01)
*G06Q 10/0635* (2023.01)
*G06Q 10/0637* (2023.01)
*G06Q 50/06* (2024.01)

(52) U.S. Cl.
CPC ..... *G06Q 10/0635* (2013.01); *G06Q 10/0637* (2013.01); *G06Q 50/06* (2013.01)

(58) Field of Classification Search
USPC .......................................................... 707/713
See application file for complete search history.

(56) References Cited

FOREIGN PATENT DOCUMENTS

| | | | |
|---|---|---|---|
| CN | 116305863 | A | 6/2023 |
| CN | 116452005 | A | 7/2023 |
| CN | 117217542 | A | 12/2023 |
| WO | 2023005700 | A1 | 2/2023 |

* cited by examiner

Scenario 1
Scenario 2
Scenario 3
Scenario 4
Generator active output (pu)
2.5
2
1.5
1
0.5
0
1 2 3 4 5 6 7 8 9 10
Generator Number

POWER SYSTEM RISK ASSESSMENT METHODS AND SYSTEMS CONSIDERING DEEP FEATURE MINING UNDER EXTREME WEATHER CONDITIONS

CROSS-REFERENCE TO RELATED APPLICATIONS

This application is a national phase of International Patent Application No. PCT/CN2024/124148, filed on Oct. 11, 2024, which claims priority to Chinese Patent Application No. 202311318484.X, filed on Oct. 12, 2023. The entire contents of these applications are herein incorporated by reference.

TECHNICAL FIELD

The present disclosure belongs to the technical field of power system risk assessment and specifically addresses methods for assessing power system operation risks, incorporating deep feature mining under strong wind extreme weather conditions, as well as related systems.

BACKGROUND

As global climate change intensifies, the frequent occurrence of extreme weather events has brought great challenges to the safe and stable operation of the power system. Extreme weather conditions such as strong winds may cause damage to power facilities, such as broken wires and collapsed towers, thus affecting power supply and system stability. Therefore, it is crucial to accurately assess the operating risks of the power system under strong wind extreme weather conditions.

Presently, there are methods that use Monte Carlo methods, big data analysis, machine learning and other technologies to analyze and evaluate the stability and security of power systems. These methods involve risk assessment models, risk level classification, and risk warning and decision-making recommendations. In addition, with the development of intelligent technology, some existing technologies use neural networks, deep learning and other methods to conduct intelligent assessments of power system operation risks, attempting to capture and respond to risks more accurately and quickly. However, most existing technologies do not consider the geographical distribution of strong winds and extreme weather and their impact on the power system, resulting in inaccurate risk assessment.

SUMMARY

The technical problem addressed by the present disclosure is to provide a power system operation risk assessment method, assessment system or device, electronic device and storage medium that considers deep mining of features under strong wind extreme weather conditions in view of the deficiencies of the present technologies.

To solve the above technical problems, the technical solution adopted by the present disclosure is:

a method for assessing power system operation risk under extreme weather conditions by considering deep feature mining, comprising:

dividing an entire power system into regions based on geographical location;

constructing a correlation model for strong wind extreme weather in multiple regions of the power system based on historical wind speed data;

building a sample set of strong wind scenarios for each region based on the correlation model;

obtaining a probability of transmission line failure in the corresponding region under each strong wind scenario in the sample set;

randomly assigning a power system operating condition to each strong wind scenario in each region, and obtaining the operating risk value of the power system under the corresponding operating condition;

constructing and training a risk assessment model;

using the risk assessment model to conduct power system operation risk assessment; and outputting a power system operation risk score.

Furthermore, the method includes providing auxiliary decision-making suggestions based on the assessment results of the power system operation risk score.

Additionally, the method for constructing and training a risk assessment model includes:

obtaining the operating data of the power system assigned to each strong wind scenario in each region and the corresponding operating risk value, and constructing a training sample set with the obtained operating data, the operating risk value, and the corresponding wind speed value;

constructing a risk assessment model;

training the risk assessment model with the training sample set, wherein the operating data and wind speed value serve as input data, and the operating risk value of the power system serves as output data.

Furthermore, the method for constructing a risk assessment model includes:

using an extreme learning machine (ELM) to construct a risk assessment model, and taking the weighted sum of the linear kernel function (Linear), the polynomial kernel function (Poly), the radial basis function kernel function (Rbf), and the wavelet kernel function (Wav) as the final kernel function.

Furthermore, the final kernel function K(x, y) is expressed as:

$$K(x, y) = w_1 K_{Linear}(x, y) + w_2 K_{Poly}(x, y) + w_3 K_{Rbf}(x, y) + w_4 K_{Wav}(x, y)$$

wherein, $K_{Linear}(x, y)$ is the linear kernel function, $K_{Poly}$ is the polynomial kernel function, $K_{Rbf}(x, y)$ is the radial basis function kernel function, $K_{Wav}(x, y)$ is the wavelet kernel function, $\gamma$ is a positive scaling factor, r is the bias, $$K_{Linear}(x, y) = x^T y$$

$$K_{Poly} = (\gamma x^T y + r)^d$$

$$K_{Rbf}(x, y) = \exp(-\gamma \|x - y\|^2)$$

$$K_{Wav}(x, y) = \phi(x - y)$$

d is the order of the polynomial, $\phi$ is a wavelet function that satisfies certain conditions, and $w_1$, $w_2$, $w_3$, $w_4$ are the weight values of the four kernel functions respectively.

Furthermore, the method to obtain the power system operation risk value includes:

obtaining a voltage over-limit index $P_u$, a flow overload index $P_p$, a flow transfer index $P_t$ and a load loss rate index $P_s$;

obtaining the power system operation risk value $\zeta=\beta_1 P_u+\beta_2 P_p+\beta_3 P_t+\beta_4 P_s$, wherein $\beta_1$, $\beta_2$, $\beta_3$, $\beta_4$ is the importance coefficient of the corresponding indicator.

Furthermore, the method for dividing the entire power system into regions includes:

using the Fuzzy C-Means (FCM) clustering algorithm to divide the power system into regions.

the objective function of the FCM algorithm is defined as $$J(U, M) = \sum_{i=1}^{N} \sum_{j=1}^{R} u_{ij}^{m} LC(i) - v_j^2.$$

wherein, R represents the number of clusters, that is, the number of regions to be divided; U represents the fuzzy matrix, which represents the membership of each node to each region; M is the cluster center matrix, which contains the center point of each region; N is the number of nodes; $u_{ij}$ is the membership of node i to region j; m is the fuzziness parameter; $v_j$ is the center point of region j.

A device for assessing power system operation risk under extreme weather conditions by considering deep feature mining, comprising: a data acquisition unit, a model training unit, and a risk assessment unit, wherein the data acquisition unit obtaining the network topology of the power system and dividing the entire power system into regions according to the geographical location; constructing a correlation model of strong wind extreme weather in multiple regions of the power system in combination with the historical wind speed data; constructing a strong wind scenario sample set for each region according to the correlation model; obtaining the transmission line failure probability of the corresponding region under each strong wind scenario in the sample set; and obtaining the operation data and operation risk value of the power system under the corresponding operation condition after randomly assigning a power system operation condition to each strong wind scenario in each region;

the model training unit constructing a training sample set and a risk assessment model, and training the risk assessment model with the training sample set;

the risk assessment unit performing an operation risk assessment on the power system using the constructed risk assessment model, and outputting an operation risk score of the power system.

An electronic device includes a processor and a memory; the memory is used to store executable instructions, and the processor is used to execute the instructions to implement the operation risk assessment method.

A computer-readable storage medium storing instructions that, when executed, implement the operation risk assessment method.

The present disclosure uses an extreme learning machine (ELM) to construct a risk assessment model. The performance of the extreme learning machine ELM mainly depends on the selection of the kernel function. Conventional kernel functions include linear kernel functions (Linear), polynomial kernel functions (Poly), radial basis function kernel functions (Rbf) and wavelet kernel functions (Wav). Wherein, the Linear kernel function is one of the simplest kernel functions. It maps the input samples based on a linear relationship and classifies them by calculating the linear combination between the input samples and the weights. The Linear kernel function is generally applicable to linearly separable problems, and its expression ability for complex nonlinear problems is relatively weak, so it may not be able to obtain good performance in some cases. The Poly kernel function is a polynomial kernel function that processes nonlinear problems by mapping the input samples to a high-dimensional space. The Poly kernel function uses polynomial fitting data to capture the relationship between more complex features. The Poly kernel function shows good performance when processing nonlinear problems, but it may be easy to over-fit when processing overly complex problems. The Rbf kernel function has a strong expression ability when processing nonlinear problems and can cope with more complex data distributions. The Wav kernel function is a kernel function based on wavelet transform. Wavelet transform is a mathematical tool for signal processing that can extract the time-frequency characteristics of signals; the mathematical representation of the Wav kernel function is usually more complex and depends on the selected wavelet basis; the Wav kernel function can handle nonlinear and non-stationary signals well.

Based on the characteristics of various kernel functions, the present disclosure uses the weighted sum of the Linear kernel function, the Poly kernel function, the Rbf kernel function, and the Wav kernel function as the kernel function of ELM, referring to this improved version as H-ELM. FIGS. 6 to 11 show the difference between the performance of the hybrid kernel function used in the present disclosure and that of other kernel functions. After data comparison and verification, the hybrid kernel function used in the present disclosure has obvious advantages.

As shown in FIG. 6, it is a schematic diagram of the accuracy of the power system risk assessment results under extreme weather conditions when the Linear kernel function is used. First, most of the data are concentrated in the range of 0.05 to 0.2, which means that the accuracy of most samples is at a relatively medium level. Extreme values can also be observed from the data, such as values higher than 0.5 or close to 0, which means that some specific samples have very high or very low accuracy when using the Linear kernel function. In particular, some values are very close to 0, such as $8.709\times10^{-6}$ and 0.000105, which shows that for some samples, this method has extremely high accuracy. But at the same time, there are also some cases where the values exceed 0.5, such as 0.5169 and 0.7032, suggesting that the method may not perform optimally in some cases. Overall, the Linear kernel function can provide medium to good accuracy for most samples, but there may be differences in some specific samples.

As shown in FIG. 7, it is a schematic diagram of the accuracy of the power system risk assessment results under extreme weather conditions when the Poly kernel function is used. From the data, it can be seen that the range of accuracy is quite wide, with the minimum value close to zero, specifically $2.6138\times10^{-6}$, indicating that the predictions of some models are quite accurate. At the same time, the maximum value reaches 0.07782, which shows that in some situations, the prediction accuracy of the model needs to be improved. Most of the data are concentrated below 0.01, which means that the model can provide relatively accurate predictions most of the time. However, there are also some values that exceed 0.05, which may indicate insufficient predictions under specific conditions. Therefore, in most cases, the Poly kernel function can provide satisfactory prediction accuracy in power system risk assessment, but there are also some specific situations where the prediction deviation is large.

As shown in FIG. 8, it is a schematic diagram of the accuracy of the risk assessment results of the power system under extreme weather when the Rbf kernel function is used. It can be observed from the data that the accuracy values are mainly concentrated in a lower range, which means that in most cases, the model using the Rbf kernel function provides a fairly high prediction accuracy. For example, some values are even lower than 0.001, which represents very high accuracy. However, there are also a few values which exceed 0.01 and even approach 0.03. These higher values may indicate that the model may have some limitations or deficiencies in certain situations or conditions. Therefore, the Rbf kernel function shows relatively high accuracy, but there are also cases of high errors.

As shown in FIG. 9, it is a schematic diagram of the accuracy of the risk assessment results of the power system under extreme weather conditions when the Wav kernel function is used. Most of these data are less than 0.01, which means that the model's predictions are relatively accurate in most cases. There are also several extremely small values, such as $2.999\times10^{-6}$, which indicate that the model has achieved very high accuracy in some cases. However, there are also some larger values, such as 0.01047, which means that the model's predictions are not ideal in some cases. Overall, the data distribution shows diversity, with both very good prediction results and some relatively poor cases. Most of the accuracy values of the Wav kernel function are concentrated in the lower range, so the Wav kernel function can provide relatively good classification accuracy for the power system safety accident level in most cases.

As shown in FIG. 10, it is a schematic diagram of the accuracy of the risk assessment results of the power system under extreme weather conditions when the hybrid kernel function used in the present invention is used. First of all, most of the data points are below 0.005, and even many data are below 0.001, which means that in most cases, the error of the model is very small. Among them, the lowest error is only a value almost close to 0, such as $9.463\times10^{-6}$, which shows that the hybrid kernel function achieves extremely high accuracy in certain situations. And this extremely low error value appears more than once in the data, further proving the stability and accuracy of the method. In addition, although there are some relatively high error values, they account for a small proportion of the overall data, and the highest error is only about 0.005, which is not a huge gap compared to the lowest error.

In summary, when the hybrid kernel function is used in the present invention, the accuracy of the risk assessment results of power system operation under extreme weather is quite outstanding, and it has the characteristics of high efficiency and stability, and has strong practical value.

The present disclosure not only considers the impact of geographical location on the risk of power system operation under extreme weather, but also integrates deep feature mining with H-ELM intelligent technology. By combining deep feature mining with historical wind speed data, a more accurate multi-region strong wind extreme weather correlation model is developed, enabling more precise predictions of the power system's response to specific wind speeds. Additionally, H-ELM is employed for training and evaluation, providing rapid, accurate, and real-time assessment of power system operation risks.

In extreme weather, power systems often face huge risks and challenges, and the present invention not only provides an accurate assessment of these risks, but also offers auxiliary decision-making suggestions and clear guidance on how to effectively respond to and manage them. This enables timely risk response and the implementation of measures to ensure the stable operation of the power system, thereby enhancing its overall resilience. The present disclosure facilitates real-time risk assessment and early warning for power system operations, helping to prevent large-scale power outages or damage caused by sudden extreme weather, thereby saving a lot of maintenance and restoration costs.

Therefore, the technical solution provided by the present disclosure has obvious improvements in prediction accuracy, real-time response, power system resilience and economic benefits compared with the existing technology.

BRIEF DESCRIPTION OF THE DRAWINGS

The present disclosure is further described in detail below in conjunction with the accompanying drawings.

DETAILED DESCRIPTION

In order to better understand the present disclosure, the following description provides a detailed explanation below, in conjunction with the embodiments and the accompanying drawings, but the protection content of the present disclosure is not limited to the following embodiments. In the following description, a large number of specific details are provided to provide a more thorough understanding of the present disclosure. However, it is obvious to those skilled in the art that the present disclosure can be implemented without one or more of these details.

Figure 1:
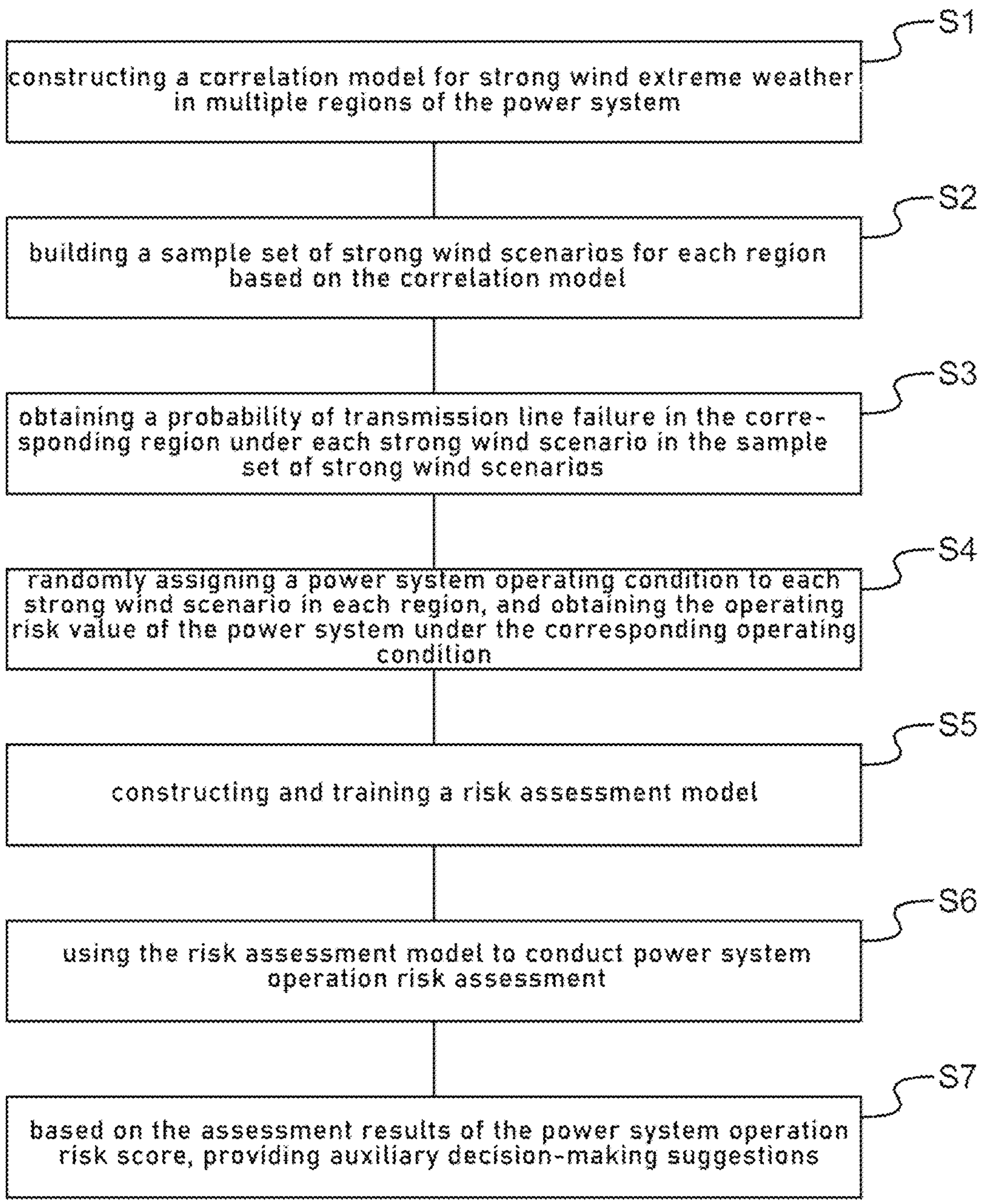
FIG. 1: Flow chart of embodiment 1 of the present disclosure.

Embodiment 1: Referring to FIGS. 1 to 10, the purpose of this embodiment is to provide a power system operation risk assessment method considering feature depth mining under extreme weather conditions. As shown in FIG. 1, the operation risk assessment method includes:

1. Step S1, constructing a correlation model for strong wind extreme weather in multiple regions of the power system.

Specifically, step S1 includes:

S11, dividing the entire power system into regions based on geographical location.

This step S11 first constructs the network topology of the entire power system, expressed as G(V, E), wherein V represents the node set and E represents the line set, then calculating the power load concentration LC(i) of each node, and the relevant formula is as follows:

$$LC(i) = \frac{\sum_{j \in N(i)} L(j)}{L(i)}$$

Wherein N(i) represents the set of nodes connected to node i, L(J) represents the power load of node j, and L(i) represents the power load of node i.

Then, the Fuzzy C-Means (FCM) clustering algorithm is used to divide the power system into regions. The objective function of the FCM algorithm is defined as $$J(U, M) = \sum_{i=1}^{N} \sum_{j=1}^{R} u_{ij}^{m} LC(i) - v_j^2.$$

wherein, R represents the number of clusters, that is, the number of regions to be divided; U represents the fuzzy matrix, which represents the membership of each node to each region; M is the cluster center matrix, which contains the center point of each region; N is the number of nodes; $u_{ij}$ is the membership of node i to region j; m is the fuzziness parameter; $v_j$ is the center point of region j.

The FCM algorithm is a conventional algorithm and will not be described here. By running the FCM algorithm, the membership of each node to each region is obtained, and then the node can be assigned to the closest region according to the membership. In this way, the power system is successfully divided into R regions, each of which contains several nodes and lines.

S12. Combined with historical wind speed data, a correlation model of strong wind extreme weather in multiple regions of the power system is constructed.

The joint distribution of multidimensional random variables is decomposed into a two-dimensional copula function including original variables and conditional variables, and the copula function is used to establish a joint distribution model of strong wind extreme weather in multiple regions. Considering the random variables related to strong wind extreme weather in these regions, the probability density function $f_{1,2,\ldots,N}(x_1, x_2, \ldots, x_N)$ can be decomposed into:

$$f_{1,2,\ldots,N}(x_1, x_2, \ldots, x_N) = f_1(x_1) \times f_{2|1}(x_2 \mid x_1) \times f_{3|1,2}(x_3 \mid x_1, x_2) \times \ldots \times f_{N|1,2,\ldots,N-1}(x_N \mid x_1, x_2, \ldots, x_{N-1})$$

Wherein $f_k(x_k)$ represents the probability density function of $X_i$, k=1, 2, . . . , R; $f_{k|1,2,\ldots,k-1}(x_k|x_1, x_2, \ldots, x_{k-1})$ represents the conditional probability density function, k=2, 3, . . . , R.

Use C-Vine to decompose the above formula, and the decomposition expression is as follows:

$$f_{1,2,\ldots,N}(x_1, x_2, \ldots, x_N) = \prod_{k=1}^{N} f_k(x_k) \times \prod_{i=1}^{N-1} \prod_{j=1}^{N-i} c_{i,i+j|1,\ldots,j-1} \left(F_{i|1,2,\ldots,i-1}(x_i \mid x_1, \ldots, x_{i-1}), F_{i+j|1,2,\ldots,i-1}(x_{i+j} \mid x_1, \ldots, x_{i-1})\right)$$

wherein $f_k(x_k)$ denotes the marginal cumulative distribution function of $X_i$, k=1, 2, . . . , N, and $F_{k|1,2,\ldots,k-1}(x_k|x_1, x_2, \ldots, x_{k-1})$ denotes the conditional cumulative distribution function, k=2, 3, . . . , N.

2. Step S2: construct a strong wind scenario sample set for each region based on the correlation model.

According to the established correlation model of strong wind extreme weather in multiple regions of the power system, combined with the Monte Carlo sampling method, samples are extracted for strong wind extreme weather scenarios in each region, and each sample corresponds to a different wind speed. For each region i, M uniformly distributed random samples $u_{i1}, u_{i2}, \ldots, u_{iM}$ are generated, wherein $0 \le u_{ij} \le 1$, and these samples represent the marginal distribution of extreme wind speeds in their respective regions.

Using the established Vine Copula model, each sample $u_{ij}$ in each region is converted into a strong wind scenario sample $X_{ij}$ in that region, and the strong wind scenario samples in that area together constitute the strong wind scenario sample set in that region.

Specifically, for each $u_{ij}$, the inverse Vine Copula transform is used to convert it into a multidimensional random variable $C_{ij}=(C_{i1j}, C_{i2j}, \ldots, C_{iNj})$. The inverse Vine Copula transform can be expressed as: $C_{ij}=(C_{i1j}, C_{i2j}, \ldots, C_{iNj})=F^{-1}(u_{ij})$, $F^{-1}$ is the inverse Vine Copula transform function; where j is the sample number of the corresponding area, $1 \le j \le M$. Then, according to the marginal distribution of each region, $C_{ij}$ is converted into strong wind extreme weather scenario samples $X_{ij}$, which can be expressed as:

$$X_{ij} = (X_{i1j}, X_{i2j}, \ldots, X_{iNj}) = \left(F_{i1}^{-1}(C_{i1j}), F_{i2}^{-1}(C_{i2j}), \ldots, F_{iN}^{-1}(C_{iNj})\right),$$

wherein $$F_{ik}^{-1}$$

is the inverse transformation function of the marginal distribution of the kth random variable in region i.

3. Step S3, obtaining the transmission line failure probability of the corresponding area in each strong wind scenario in the sample set.

Strong winds cause horizontal wind loads on overhead lines that exceed their corresponding loads, and vertical wind loads on poles and their connecting wires that exceed the maximum bearing capacity of the poles. These are the main causes of power line disconnections and tower collapses. Therefore, transmission line failures caused by strong winds mainly include line disconnections and tower collapses.

The ultimate wind load that the transmission line can withstand is set as $T_{Lmax}$, then the critical wind speed of power line disconnection $$v_{Lmax} = \sqrt{\frac{1600 T_{Lmax}}{\alpha \mu_Z \beta_c SDL \sin^2 \delta}};$$

the ultimate wind load that the tower can withstand is set as $T_{Tmax}$, then the critical wind speed of tower collapse $$v_{Tmax} = \sqrt{\frac{2T_{Tmax}}{\rho C_d(\alpha) A_f}}.$$

Among them, $\alpha$ is the wind pressure unevenness coefficient; $\mu_z$ is the wind pressure height coefficient; $\beta_c$ is the wind load adjustment coefficient; S is the body coefficient of the conductor; D is the power line diameter; L is the power line length; $\delta$ is the angle between the wind direction and the direction of the transmission line; $\rho$ is the air density; $C_d(\alpha)$ is the drag coefficient of the wind load on the tower components; $A_f$ is the effective area of the tower that withstands wind pressure.

For transmission lines, it can be assumed that when the predicted wind speed v is less than the critical wind speed $v_{Lmax}$ of the line, the probability of power outage is 0; when the predicted wind speed v is greater than $v_{Lmax}$, the probability of power outage can be expressed by the probability density function based on the joint distribution of wind speed and wind direction. The probability calculation model of power outage under extreme wind speed is:

$$P_L = \begin{cases} 0, & v \le v_{Lmax} \\ \sum_{i=1}^{16} f(\theta_i) \int_{v_{Lmax}}^{v} f_{\theta_i}(u)\,du, & v > v_{Lmax} \end{cases}$$

Similarly, the probability calculation model of power tower collapse under extreme wind speed is:

$$P_T = \begin{cases} 0, & v \le v_{Tmax} \\ \sum_{i=1}^{16} f(\theta_i) \int_{v_{Tmax}}^{v} f_{\theta_i}(u)\,du, & v > v_{Tmax} \end{cases}$$

Among them, $f(\theta_i)$ is the wind direction frequency in the $\theta_i$ direction; $f_{\theta_i}(u)$ is the wind speed probability density function in the $\theta_i$ direction.

4. Step S4, randomly assign a power system operating condition to each strong wind scenario in each region, and obtain the operating risk value of the power system under the corresponding operating condition.

Specifically, step S4 includes:

S41. Randomly assign load conditions of the power system for each strong wind scenario in each region.

A random number generator is used to generate random load values to ensure that they are within the reasonable range of system load. Specifically, $S_{ij}=S_{min}+\text{rand}(0,1)\cdot(S_{max}-S_{min})$ is used to represent the load distribution process, where $S_{min}$ and $S_{max}$ are the minimum and maximum values of the system load, respectively; rand(0,1) represents a random number uniformly distributed between 0 and 1; S is a matrix of size M×N, representing the load distribution of each node in each scenario, and the element $S_{ij}$ in the matrix represents the load of the jth node in the ith scenario; M is the total number of strong wind extreme weather scenarios; N is the number of nodes in the power system.

S42. Use optimal power flow to calculate the generator output under a given strong wind scenario.

The goal of the optimal power flow calculation is to minimize power loss and meet the power flow balance and various constraints of the power system, that is, $$\min \sum_{i=1}^{N} \sum_{j=1}^{N} I_{ij} P_i P_j,$$

wherein $P_i$ is the generator output of node i and $I_{ij}$ is the admittance between nodes i and j. The constraints include load-power relationship, power flow balance, generator output range, and node voltage amplitude range.

The load-power relationship constraint is $$P_i = P_i^L - P_i^D.$$

Where $P_i$ is the generator output of node i, $$P_i^L$$

is the load power of node i, and $$P_i^D$$

is the distributed power generation power of node i.

The power flow balance constraint is $$\sum_{j=1}^{N} I_{ij} (V_i V_j \cos(\theta_i - \theta_j) - V_i V_j \sin(\theta_i - \theta_j)) = 0.$$

Wherein, $I_{ij}$ is the admittance between nodes i and j, $V_i$ is the voltage amplitude at node i, and $\theta_i$ is the voltage phase angle at node i.

The generator output range constraint is $$P_i^{min} \le P_i \le P_i^{max}).$$

Where $P_i$ is the generator output of node i.

$$P_i^{min} \text{ and } P_i^{max}$$

are the minimum and maximum values of the generator output, respectively.

The node voltage amplitude range constraint is $$V_i^{min} \le V_i \le V_i^{max}.$$

Where $V_i$ is the voltage amplitude of node i, $$V_i^{min} \text{ and } V_i^{max}$$

are the minimum and maximum values of the node voltage amplitude respectively.

S43. Obtain the power system operation risk value under the corresponding strong wind scenario.

The power system operation risk value related indicators include voltage over-limit indicator, power flow overload indicator, power flow transfer degree indicator and load loss rate indicator.

The voltage over-limit index is defined as $$P_u = \sum_{i=1}^{n} P_u^i(U_i).$$

Wherein n is the number of buses;

$$P_u^i(U_i)$$

represents the voltage over-limit situation of bus i, that is:

$$P_u^i(U_i) = \begin{cases} \frac{U_i - 1}{U_{upp} - 1}, & U_i > 1 \\ \frac{1 - U_i}{1 - U_{low}}, & U_i \leq 1 \end{cases}$$

Among them, $U_i$ is the bus voltage; $U_{upp}$ and $U_{low}$ are the upper and lower limits of the bus voltage respectively.

The power flow overload index is defined as $$P_p = \sum_{i \in L_p} \frac{P_i - P_{i,max}}{P_{i,max}}.$$

Wherein $L_p$ represents the set of lines with power flow overload; $P_i$ represents the current transmission power of the line; and $P_{i,max}$ represents the rated transmission power of the line.

The power flow transfer index reflects the total power transmission distance of the system before and after the fault. First, define the total power transmission distance $L_t = \Sigma_{l \in L} |\omega_l p_l|$, wherein L is the set of transmission lines. $\omega_l$ is the length of transmission line l, which represents the transmission distance of power on line l and is expressed by the line electrical distance (line impedance value), that is, $\omega_l = R_l + jX_l$, where $R_l$ is the line resistance; $X_l$ is the line reactance. $p_l$ is the active power transmitted by line l, that is, $$p_l = p_{i,j} = U_i^2 g_{ij} - U_i U_j (g_{ij} \cos\theta_{ij} + b_{ij} \sin\theta_{ij}),$$

wherein $U_1$、$U_j$ are the voltages of nodes i、j respectively; $g_{ij}$、by are the conductance and susceptance of line ij respectively; $\theta_{ij}$ is the voltage phase difference between nodes i、j.

In summary, the power transfer degree is defined as $P_t = L_t - L_{t0}$. Among them, $L_0$ and $L_t$ are the total power transmission distance of the system before and after the fault, respectively. The greater the change, the less likely there is an alternative active power transmission channel near the fault line, requiring the active power to migrate over a larger area within the system, which makes the system more vulnerable.

The load loss rate index is defined as $P_s = \Sigma_{i \in L_s} \alpha_i L_i$. Wherein, $L_s$ represents the set of nodes that need to be load cut; $\alpha_i$ is the importance coefficient of the ith load cutting node; $L_i$ is the load cutting amount of the ith load cutting node.

Finally, the above four indicators are combined to obtain the power system operation risk value $\zeta = \beta_1 P_u + \beta_2 P_p + \beta_3 P_t + \beta_4 P_s$, wherein $\beta_i$ is the importance coefficient of the corresponding indicator.

Preferably, $\beta = [\beta_1, \beta_2, \beta3, \beta_4] = [0.5, 0.8, 1.0, 2.0]$.

5. Step S5, construct and train the risk assessment model.

Specifically, step S5 includes:

S51, construct a training sample set.

Step S4 is executed repeatedly in a loop, where the operation data of the power system allocated to each strong wind scenario in each region, along with the corresponding operation risk value, are obtained each time. A training sample set is constructed with the obtained operation data, operation risk value and corresponding wind speed value until the number of samples in the training sample set meets the training requirements. The operation data of the power system includes the active and reactive loads, voltage and phase of the bus, the active and reactive output and operation status of the generator, the active and reactive power at both ends of the line, the fault probability, the fault location and other data. The fault probability and the fault location are determined by the transmission line fault probability obtained in step S3.

S52, build a risk assessment model.

This step uses the Extreme Learning Machine (ELM) to build a risk assessment model, and uses the weighted sum of the linear kernel function (Linear), the polynomial kernel function (Poly), the radial basis function kernel function (Rbf), and the wavelet kernel function (Wav) as the ELM kernel function. In the present application, the improved ELM is called H-ELM. The H-ELM kernel function K(x, y) is expressed as:

$$K(x, y) = w_1 K_{Linear}(x, y) + w_2 K_{Poly}(x, y) + w_3 K_{Rbf}(x, y) + w_4 K_{Wav}(x, y)$$

Wherein, $K_{Linear}(x, y)$ is the linear kernel function, $K_{Poly}$ is the polynomial kernel function, $K_{Rbf}(x, y)$ is the radial basis function kernel function, $K_{Wav}(x, y)$ is the wavelet kernel function, $\gamma$ is a positive scaling factor, r is the bias, d is the order of the polynomial, $\phi$ is a wavelet function that satisfies certain conditions, and $w_1$, $w_2$, $w_3$, $w_4$ are the weight values of the four kernel functions respectively.

S53. Train the risk assessment model with the training sample set.

The wind speed value and power system operation data in the training $$K_{Linear}(x, y) = x^T y$$

$$K_{Poly} = (\gamma x^T y + r)^d$$

$$K_{Rbf}(x, y) = \exp(-\gamma \|x - y\|^2)$$

$$K_{Wav}(x, y) = \phi(x - y)$$

sample set are used as the input data for H-ELM training, and the corresponding power system operation risk value is used as the output data for H-ELM training.

Randomly initialize the hidden layer weights and biases, randomly initialize the weights for each neuron in the H-ELM hidden layer, and initialize the bias of each hidden neuron. Convert the input data to the hidden layer output through the weighted kernel function:

$$K(x, y) = w_1 K_{Linear}(x, y) + w_2 K_{Poly}(x, y) + w_3 K_{Rbf}(x, y) + w_4 K_{Wav}(x, y).$$

$w_1$, $w_2$, $w_3$, $w_4$ is the weight of each kernel function, x is the input data.

Using the Moore-Penrose pseudo-inverse method, the weights from the hidden layer to the output layer are solved, which can be expressed as $\beta=H^{\dagger}T$, wherein $H^{\dagger}$ is the pseudo-inverse of the hidden layer output and T is the target output.

6. Step S6, using the constructed risk assessment model to conduct power system operation risk assessment.

The wind speed values of strong wind extreme weather in R regions, as well as the active and reactive loads, voltage and phase of the power system bus, the active and reactive output and operating status of the generator, the active and reactive power at both ends of the line, the fault probability and the fault location are collected and input into the H-ELM risk assessment model. The output of H-ELM is the operation risk value (of the power system in the corresponding region. Based on the relationship between the risk value and the risk level, the operation risk score (risk level) of the power system in the corresponding region is determined. The corresponding relationship between the risk value and the risk score (risk level) is as follows:

| | Risk value range | | | | |
|---|---|---|---|---|---|
| | $0 \le \zeta < 0.8$ | $0.8 \le \zeta < 2$ | $2 \le \zeta < 7$ | $7 \le \zeta < 10$ | $\zeta \ge 10$ |
| Risk score (risk level) | Safe | Low risk | Medium Risk | High Risk | Dangerous |

7. Step S7, based on the evaluation results of the power system operation risk, obtain auxiliary decision-making suggestions.

Based on the risk value $\zeta$ obtained from the power system operation risk evaluation results, risk warning and regulation are carried out to obtain auxiliary decision-making suggestions. Specifically:

If $\zeta<2$, the power system is in a safe or low-risk operating state, and the auxiliary decision recommendation is determined as: enter the power generation re-dispatch process. The generator re-dispatch strategy is the first response measure to the power system risk. By adjusting the operation of the generator, it can output more power to meet the load needs. Under the constraints of ensuring that the voltage tolerance and the transmission power of each branch are met, the optimal output power of the generator and the power flow distribution of the power system are calculated to achieve reliable power supply at the lowest cost. The objective $$\text{function } \min f(x) = \omega_1\left(\sum_{i=1}^{N_g} \Delta P_{Gi}^2 + \sum_{i=1}^{N_g} \Delta Q_{Gi}^2\right) + \omega_2 R_{OL} + \omega_3 R_{VV},$$

constraints are:

$$\begin{cases} \sum_{j\neq i} P_{ij} = P_{Gi} + \Delta P_{Gi} - P_{Li} \\ \sum_{j\neq i} Q_{ij} = Q_{Gi} + \Delta Q_{Gi} - Q_{Li} \\ \Delta P_{Gi,min} - P_{Gi} \le \Delta P_{Gi} \le \Delta P_{Gi,max} - P_{Gi} \\ \Delta Q_{Gi,min} - Q_{Gi} \le \Delta Q_{Gi} \le \Delta Q_{Gi,max} - Q_{Gi} \\ P_{ij,min} \le P_{ij} \le P_{ij,max} \\ V_{i,min} \le V_i \le V_{i,max} \end{cases}$$

Wherein, $\Delta P_{Gi}$ represents the active power output of power re-dispatch, $\Delta Q_{Gi}$ represents the reactive power, $N_g$ represents the number of generators working simultaneously in the system, $R_{OL}$ is the overload index, $R_{VV}$ is the risk index, $\omega_1$ represents the cost weight of power re-dispatch, $\omega_2$, $\omega_3$ represent the weights of the overload index and the risk index, $P_{Li}$ represents the active power generated by the load, $Q_{Li}$ is the reactive power generated by the load, $P_{ij}$ represents the active power from i to j, $Q_{ij}$ represents the corresponding reactive power, $P_{Gi}$ and $Q_{Gi}$ represent the active and reactive power output of power generation respectively, $V_i$ represents the node voltage at point i, and the footnote max represents its maximum value and min represents its minimum value.

If $\zeta\ge 2$, the power system is in a medium-risk or higher-risk operating state, and the auxiliary decision recommendation is determined to be: enter the load reduction process. When the output power of the generator set cannot meet the risk control requirements no matter how it is dispatched, it is necessary to reduce the load power of the power system on the basis of re-balancing the power generation to achieve a balance between supply and demand of the power system under risk conditions. The objective function min $$f(x) = \omega_1\left(\sum_i^{N_b} \Delta P_{Li} + \sum_i^{N_b} \Delta Q_{Li}\right) + \omega_2 R_{OL} + \omega_3 R_{VV},$$

the constraints are:

$$\begin{cases} \sum_{j\neq i} P_{ij} = P_{Gi} - (\Delta P_{Gi} - P_{Li}) \\ \sum_{j\neq i} Q_{ij} = Q_{Gi} - (Q_{Li} - \Delta Q_{Gi}) \\ P_{Gi}^{min} \le P_{Gi} \le P_{Gi}^{max} \\ Q_{Gi}^{min} \le Q_{Gi} \le Q_{Gi}^{max} \\ P_{ij}^{min} \le P_{ij} \le P_{ij}^{max} \\ V_i^{min} \le V_i \le V_i^{max} \\ 0 \le \Delta P_{Li} \le \Delta P_{Li}^{max} \\ 0 \le \Delta Q_{Li} \le \Delta Q_{Li}^{max} \end{cases}$$

Wherein, $\Delta P_{Li}$ represents the reduction of active power, $\Delta Q_{Li}$ represents the reduction of reactive power, $N_b$ represents the number of load-loss nodes, $R_{OL}$ is the overload index, $R_{VV}$ is the risk index, $\omega_1$, $\omega_2$ and $\omega_3$ represent the weights of the corresponding risk indicators, $P_{Li}$ represents the active power generated by the load, $Q_{Li}$ is the reactive power generated by the load, $P_{ij}$ represents the active power from i to j, $Q_{ij}$ represents the corresponding reactive power, $P_{Gi}$ and $Q_{Gi}$ represent the active and reactive power of the power generation output, $V_i$ represents the node voltage at point i, and the footnote max represents its maximum value and min represents its minimum value. When a risk occurs, the power system dispatcher can dynamically adjust the weights of each risk indicator according to the actual situation, and thus obtain risk control under different risk states.

The execution of this embodiment is verified below. First, the Matpower toolkit is used to construct a power system model to perform optimal power flow calculations to generate data samples. The IEEE-39 system is used for simulation experiments, and the constructed power system includes 24 nodes, 38 lines, and 33 generators. In order to obtain more negative samples, the rated power of all lines is changed to 81% of the original to weaken the system grid structure. The active output of the generator is changed to 95% of the original, and the maximum active power of the generator is changed to 90% of the original, increasing the likelihood of over-limit, overload and other situations. The Monte Carlo method is used to obtain 10,000 normal operation scenario samples.

Figure 2:
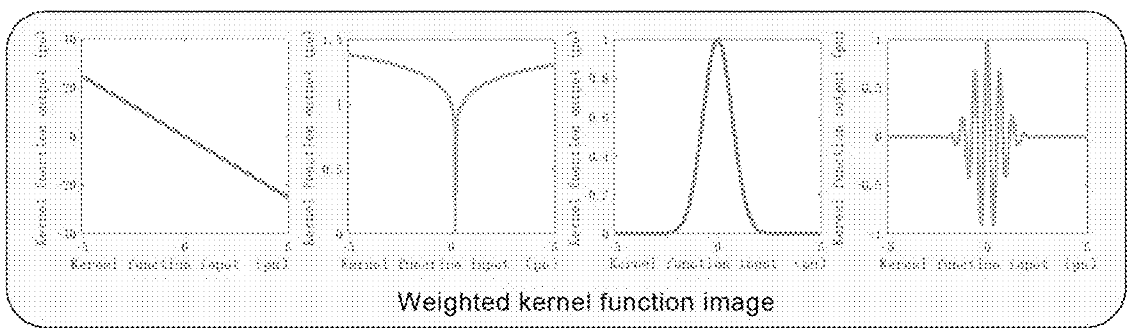
FIG. 2: Schematic diagram of the structure of H-ELM in embodiment 1 of the present disclosure.
Figure 2:
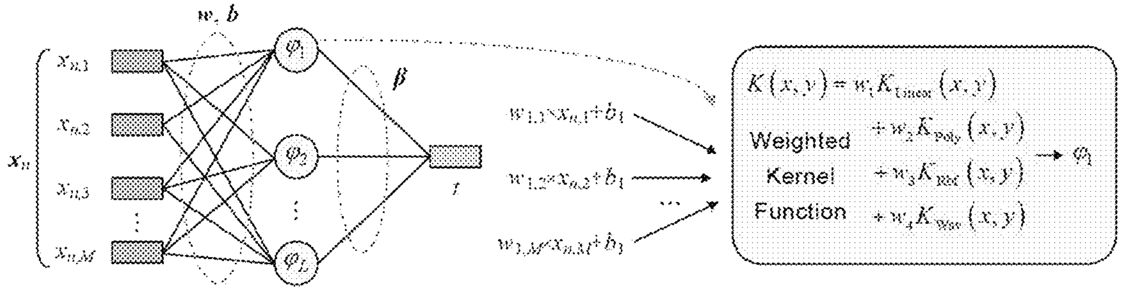
Figure 3:
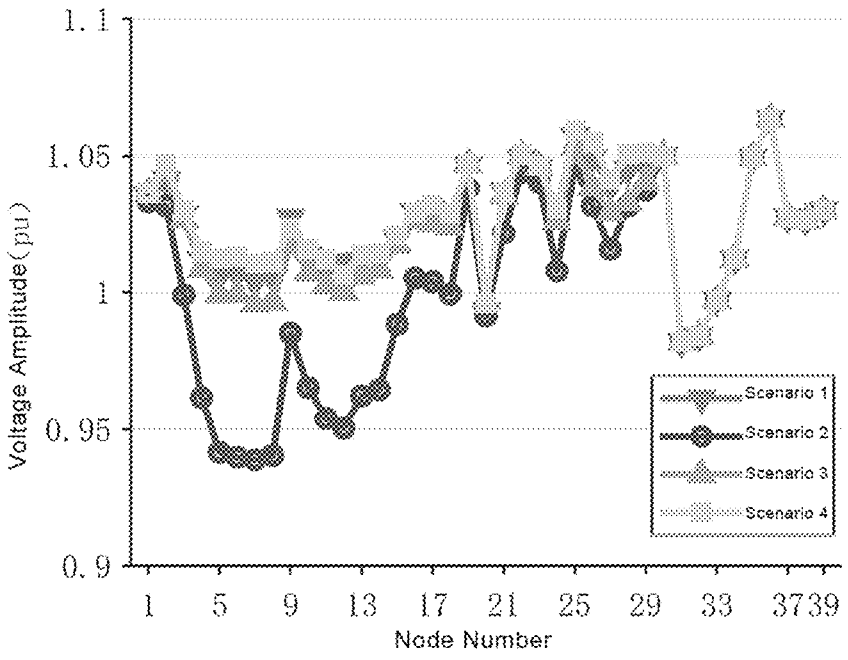
FIG. 3: Schematic diagram of node voltage amplitude in a typical operation scenario in embodiment 1 of the present disclosure.

The entire power system is then divided into four regions, A, B, C, and D, and wind speed data is obtained. This data, sourced from actual measurements of the power system, is applied to regions A, B, C, and D. Assuming a base wind speed value of 20 m/s, which is standardized across these regions. The standardized wind speed, ranging from 0 to 1, is divided into 20 intervals, each with a length of 0.05. The wind speed frequency and probability density for each region (A to D) are calculated for each interval, as shown in FIG. 2. On this basis, the probability density function of the wind speed from region A to region D is obtained using the non-parametric kernel density estimation method.

The probability density function of the joint distribution is decomposed using the C-vine method, and region A is regarded as the root node. The maximum likelihood estimation method is used to obtain the probability density function of the correlation coefficient between the two regions based on the nonparametric kernel density estimation. The correlation coefficients of different copula types are shown in the following table.

| Copula types | Region A and region B | | Region A and region C | | Region A and region D | |
|---|---|---|---|---|---|---|
| normal copula | 1.00 | 0.38 | 1.00 | 0.40 | 1.00 | 0.39 |
| | 0.38 | 1.00 | 0.40 | 1.00 | 0.39 | 1.00 |
| t copula | 1.00 | 0.49 | 1.00 | 0.47 | 1.00 | 0.47 |
| | 0.49 | 1.00 | 0.47 | 1.00 | 0.47 | 1.00 |
| clayton copula | 0.48 | | 0.49 | | 0.50 | |
| frank copula | 0.31 | | 0.31 | | 0.32 | |
| gumbel copula | 0.42 | | 0.43 | | 0.43 | |

As shown in the following table, after comparing the Euclidean distances between the empirical copula function and the evaluated copula functions (including normal copula, t copula, gumbel copula, clayton copula, and frank copula), it can be seen that in two different regions, the Euclidean distance between the empirical copula function and the gumbel copula is the shortest, so the gumbel copula is selected as the optimal copula function.

| Copula types | normal | t | gumbel | clayton | frank |
|---|---|---|---|---|---|
| Region A and region B | 2.511 | 2.006 | 1.572 | 5.899 | 2.916 |
| Region A and region C | 2.489 | 1.717 | 1.500 | 6.251 | 2.920 |
| Region A and region D | 2.679 | 1.862 | 1.616 | 6.526 | 3.104 |

Figures 4, 5:
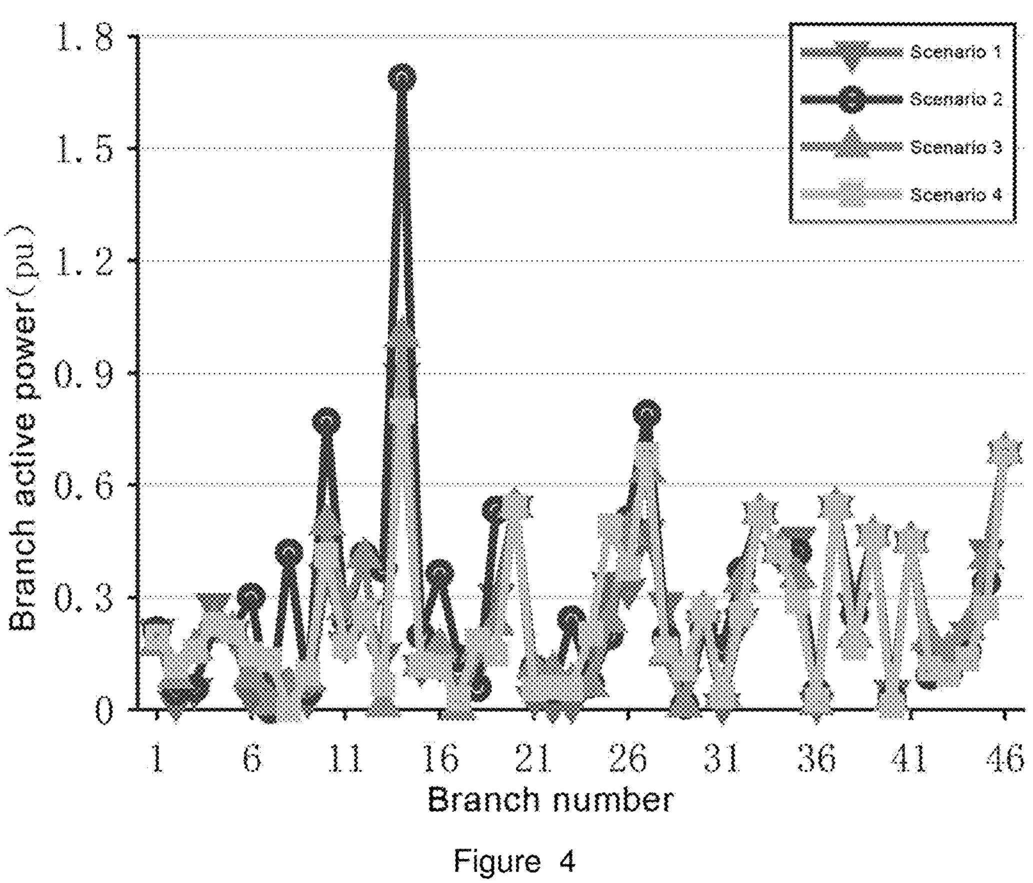
FIG. 4: Schematic diagram of branch active power flow in a typical operation scenario in embodiment 1 of the present disclosure.
FIG. 5: Schematic diagram of generator active output in a typical operation scenario in embodiment 1 of the present disclosure.
Figure 6:
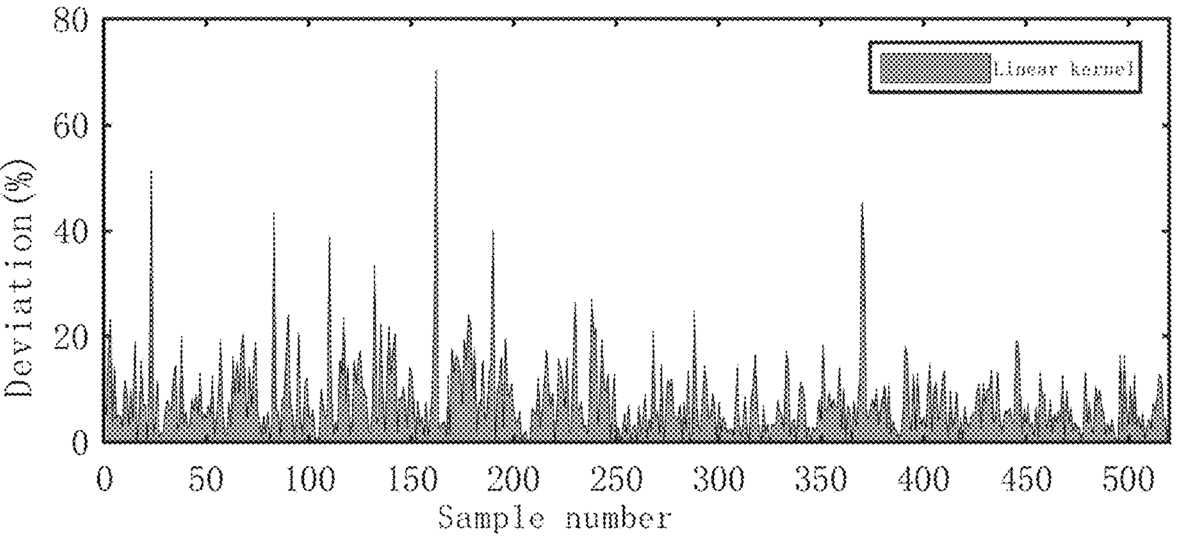
FIG. 6: Schematic diagram of the accuracy of risk assessment results when using Linear kernel function in embodiment 1 of the present disclosure.

Using the C-vine copula model constructed above, combined with the Monte Carlo sampling method, the strong wind scenarios in each region are sampled, with a sampling number of 100. Then the probability of transmission line failure (line breakage and tower collapse) in each region under different strong wind scenarios is calculated, and the strong wind scenarios and the normal operation scenes of the power system are randomly combined to obtain 50,000 normal operation scenarios of the power system under strong wind conditions. As shown in FIGS. 4 to 6, the schematic diagrams of node voltage amplitude, branch active power flow and generator active output for four typical operation scenarios are shown respectively. Using the Monte Carlo sampling method, 50,000 random combination results are randomly sampled for faults, and 9 faults are extracted for each random combination, totaling 500,000 data. Each data sample contains wind speed value, bus active and reactive load, voltage and phase, generator active and reactive output, operating status, active and reactive power and operating status at both ends of the line. Using the 500,000 data, the power system operation risk value is calculated, and this result serves as the output data of H-ELM.

Figure 7:
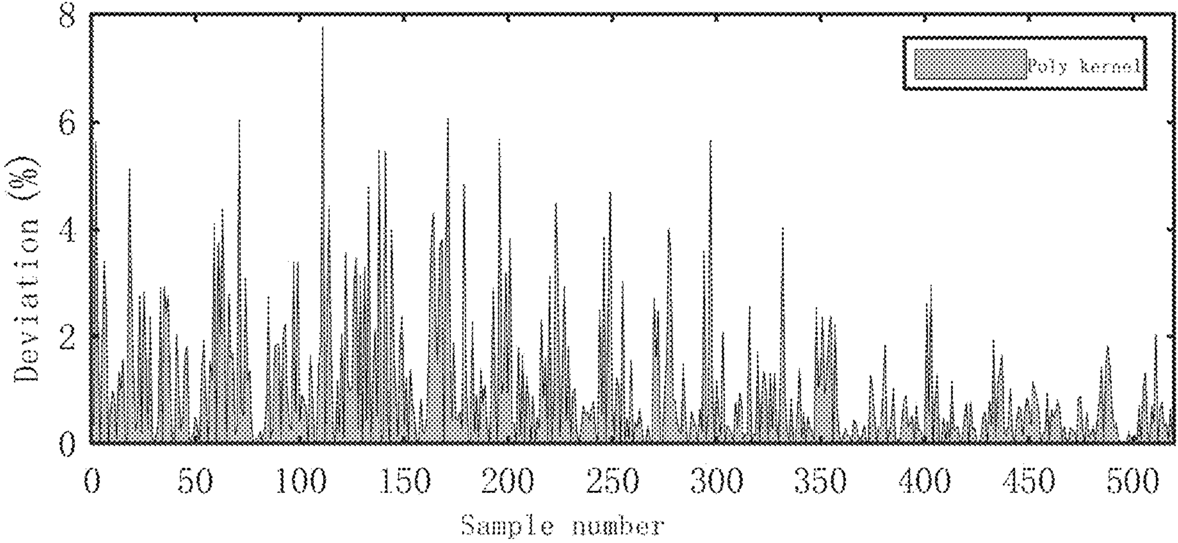
FIG. 7: Schematic diagram of the accuracy of risk assessment results when using Poly kernel function in embodiment 1 of the present disclosure.
Figure 8:
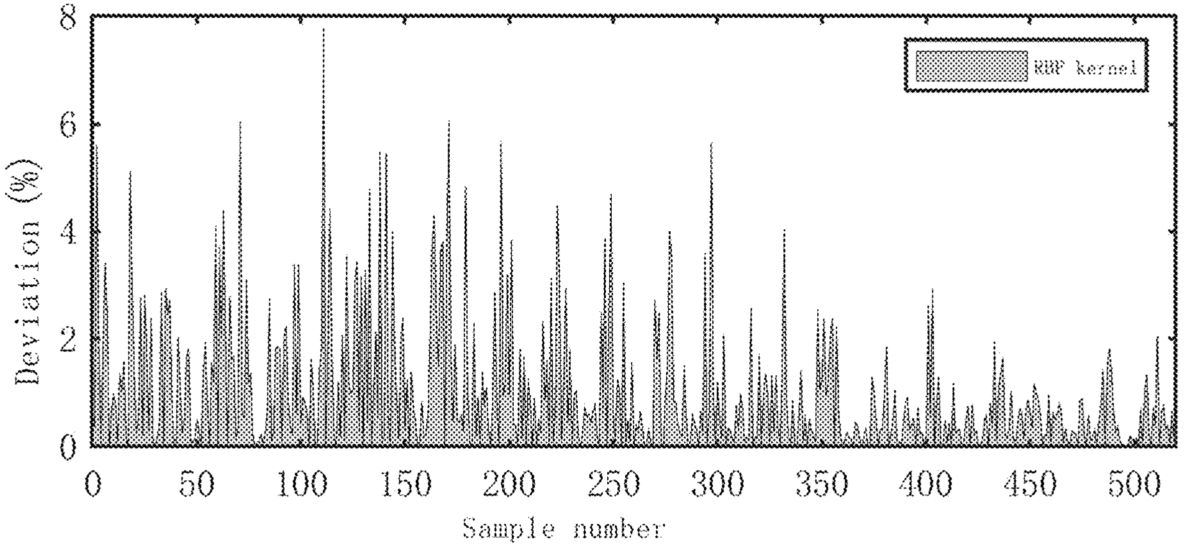
FIG. 8: Schematic diagram of the accuracy of risk assessment results when using Rbf kernel function in embodiment 1 of the present disclosure.
Figure 9:
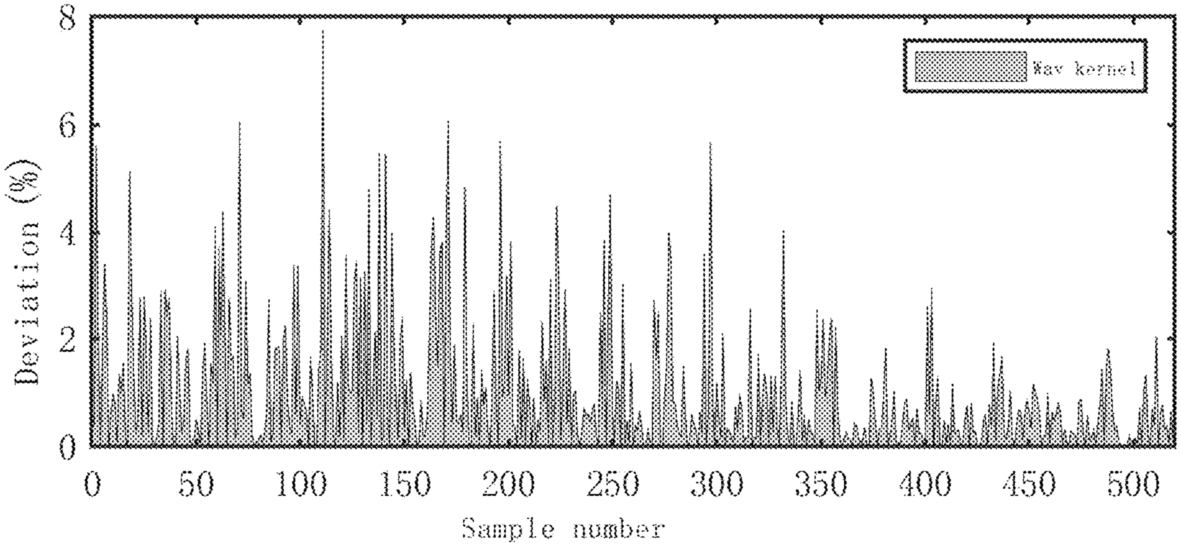
FIG. 9: Schematic diagram of the accuracy of risk assessment results when using Wav kernel function in embodiment 1 of the present disclosure.
Figure 10:
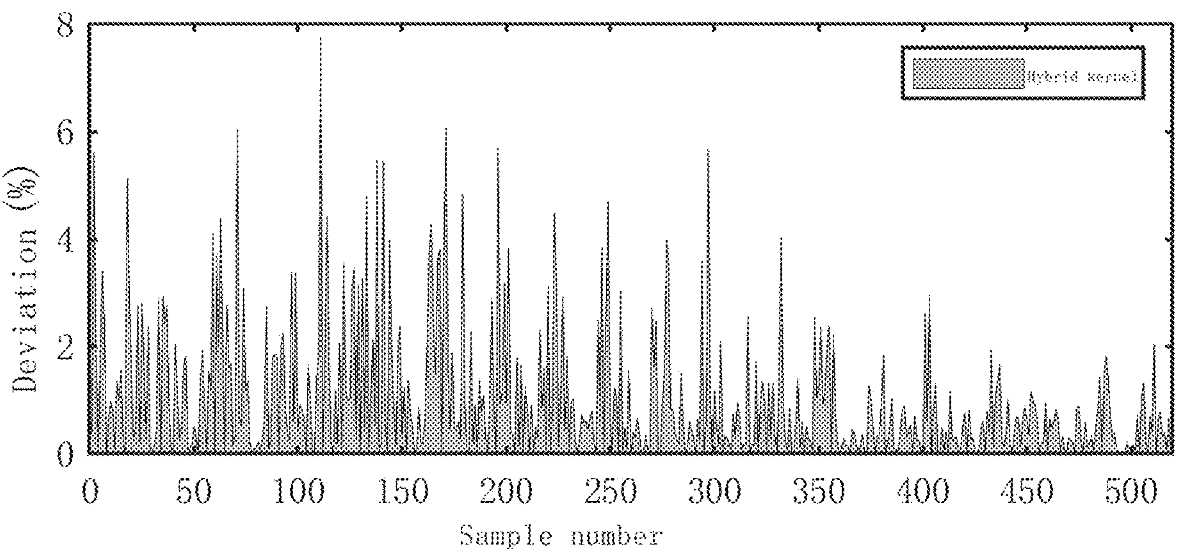
FIG. 10: Schematic diagram of the accuracy of risk assessment results when using mixed kernel function in embodiment 1 of the present disclosure.

In addition, the present disclosure has collected a total of 500,000 data samples for model training, wherein the accuracy of the model was tested using different kernel functions with 520 data samples utilized for training the ELM model. FIG. 6 is a schematic diagram of the accuracy of the risk assessment results when the Linear kernel function is used, FIG. 7 is a schematic diagram of the accuracy of the risk assessment results when the Poly kernel function is used, FIG. 8 is a schematic diagram of the accuracy of the risk assessment results when the Rbf kernel function is used, FIG. 9 is a schematic diagram of the accuracy of the risk assessment results when the Wav kernel function is used, and FIG. 10 is a schematic diagram of the accuracy of the risk assessment results when the hybrid kernel function is used. It can be seen from the test results that, when the present invention uses the hybrid kernel function as the kernel function of the ELM, the accuracy of the power system safety accident level classification is quite outstanding.

Figure 11:
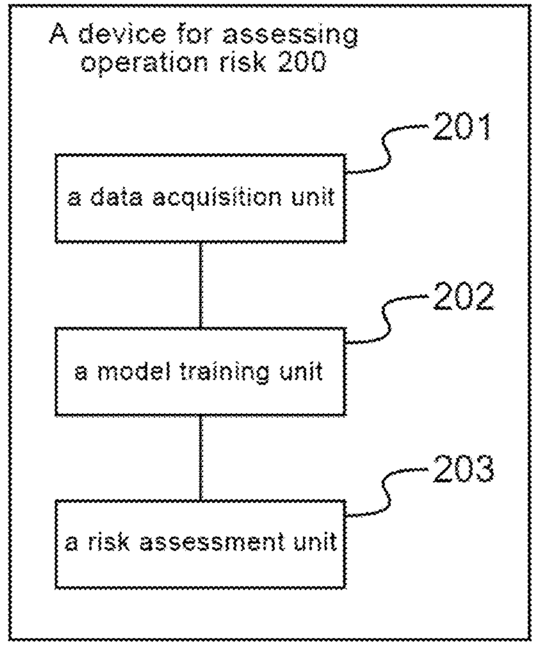
FIG. 11: Schematic diagram of the structure of embodiment 2 of the present disclosure.

Embodiment 2: Referring to FIG. 11, the purpose of this embodiment is to provide a power system operation risk assessment device that considers deep feature mining under extreme weather conditions, and is used to perform the operation risk assessment method as in Embodiment 1. The operation risk assessment device 200 includes: an acquisition unit 201, a training unit 202, and an evaluation unit 203.

The acquisition unit 201 is used to acquire the network topology of the power system and divide the entire power system into regions according to the geographical location; to construct a correlation model of strong wind extreme weather in multiple regions of the power system in combination with historical wind speed data; to construct a strong wind scenario sample set for each region according to the correlation model; to obtain the transmission line failure probability of the corresponding region under each strong wind scenario in the sample set; to obtain the operation data and operation risk value of the power system under the corresponding operation condition after randomly assigning a power system operation condition to each strong wind scenarios in each region. Specifically, in combination with Embodiment 1, the acquisition unit 201 is used to perform steps S1 to S4.

The training unit 202 is used to construct a training sample set and a risk assessment model, and to train the risk assessment model with the training sample set. Specifically, in combination with Embodiment 1, the training unit 202 is configured to execute step S5.

The evaluation unit 203 is used to configure the constructed risk assessment model to evaluate the operation risk of the power system, and to obtain auxiliary decision-making suggestions based on the evaluation results of the operation risk. Specifically, in combination with Example 1, the training unit 203 is used to execute steps S6 to S7.

Regarding the device in this embodiment, the specific manner in which each unit performs the operation has been described in detail in Example 1, and will not be explained in detail here.

It should be understood by those skilled in the art that, for the sake of convenience and simplicity of description, the device embodiment of this application only uses the division of the above-mentioned functional modules or units as an example. In practical applications, the above-mentioned function allocation can be completed by different functional modules or units as needed, that is, the internal structure of the device is divided into different functional modules or units to complete all or part of the functions described above.

Figure 12:
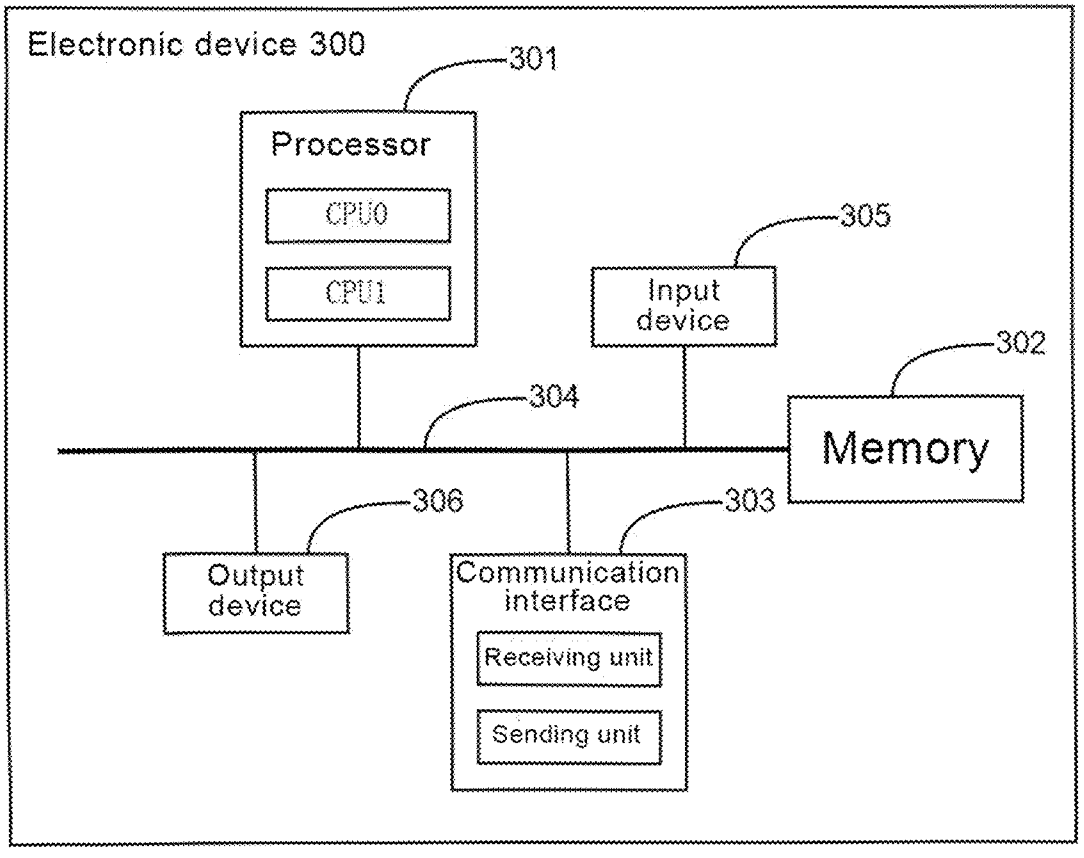
FIG. 12: Schematic diagram of the structure of embodiment 3 of the present disclosure.

Example 3: Referring to FIG. 12, the purpose of this embodiment is to provide an electronic device 300, including at least one processor 301 and one or more memories 302 for storing executable instructions of the processor 301. Among them, the processor 301 is used to execute the instructions stored in the memory 302 to implement the operation risk assessment method described in Example 1.

The electronic device 300 further includes a bus 304, and the processor 301 and the memory 302 are connected to each other via the bus 304, or are connected to each other in other ways.

The processor 301 may be a central processing unit (CPU), a general-purpose processor network processor (NP), a digital signal processor (DSP), a microprocessor, a micro-controller, a programmable logic device (PLD), or any combination thereof. The processor 301 may also be other devices with processing functions, such as circuits, devices, or software modules, without limitation. In one example, the processor 301 may include one or more CPUs, such as CPU0 and CPU1 in FIG. 12.

Among them, the memory 302 can be a read-only memory (ROM) or other types of static storage devices that can store static information and/or instructions, or a random access memory (RAM) or other types of dynamic storage devices that can store information and/or instructions, or an electrically erasable programmable read-only memory (EEPROM), a compact disc read-only memory (CD-ROM) or other optical disc storage, optical disc storage (including compressed optical disc, laser disc, optical disc, digital versatile disc, Blue-ray disc, etc.), a disk storage medium or other magnetic storage device, etc., without limitation.

It should be noted that the memory 302 can exist independently of the processor 301, or it can be integrated with the processor 301. The memory 302 can be used to store instructions or program codes or some data, etc. The memory 302 can be located in the electronic device 300, or it can be located outside the electronic device 300, without limitation.

As an optional implementation, the electronic device 300 also includes a communication interface 303. The communication interface 303 is a wired interface (or port), such as a fiber distributed data interface (FDDI), a gigabit Ethernet interface (GE), etc. Alternatively, the communication interface 303 is a wireless interface. The communication interface 303 can be a module, a circuit, a communication interface, or any device capable of achieving communication. The communication interface 303 enables communication with other devices or other communication networks, which can be Ethernet, a radio access network (RAN), a wireless local area network (WLAN), etc.

As an optional implementation, the electronic device 300 also includes an input device 305 and an output device 306. For example, the input device 305 is a device such as a keyboard, a mouse, a microphone, or a joystick, and the output device 306 is a device such as a display screen and a speaker.

It should be noted that the electronic device 300 may be a desktop computer, a portable computer, a network server, a mobile phone, a tablet computer, a wireless terminal, an embedded device, a chip system, or any device having a similar structure as shown in FIG. 12. In addition, the component structure shown in FIG. 12 does not constitute a limitation on the terminal device. In addition to the components shown in FIG. 12, the electronic device 300 may include more or fewer components than shown in the figure, or combine certain components, or arrange the components differently.

Embodiment 4: The purpose of this embodiment is to provide a computer-readable storage medium.

All or part of the processes in the above method embodiment can be completed by computer instructions to instruct the relevant hardware, and the program can be stored in the computer-readable storage medium. When the program is executed, it can implement the operation risk assessment method described in embodiment 1.

The computer-readable storage medium can be an internal storage unit of the electronic device in embodiment 3, such as a hard disk or memory. The computer-readable storage medium can also be an external storage device of the electronic device, such as a plug-in hard disk, a smart media card (SMC), a secure digital (SD) card, a flash card, etc. Further, the computer-readable storage medium can also include both the internal storage unit and the external storage device of the above electronic device. The computer-readable storage medium is used to store computer programs and other programs and data required by the electronic device. The computer-readable storage medium can also be used to temporarily store data that has been output or is to be output.

In conjunction with the several embodiments provided in this application, it should be understood that the provided devices and methods can be implemented in other ways. The device embodiments described above are only schematic. For example, the division of the modules or units is only a logical function division. In actual implementation, other division methods may be used, such as combining or integrating multiple modules, units, or components into another device, or omitting or not executing certain features.

In addition, in the device embodiments of this application, each functional module or unit can be integrated into one unit, or each module or unit can exist physically separately, or two or more modules or units can be integrated into one unit. The above-mentioned integrated unit can be implemented in the form of hardware or in the form of a software functional module.

If the above-mentioned integrated unit is implemented in the form of a software functional module and sold or used as an independent product, it can be stored in a readable storage medium. Based on this understanding, the technical solution of the embodiment of the present application is essentially or part of the contribution to the existing technologies or all or part of the technical solution can be embodied in the form of a software product, which is stored in a storage medium and includes several instructions to enable a device (which can be a single-chip microcomputer, chip, etc.) or a processor to execute all or part of the steps of the method described in each embodiment of the present application. The aforementioned storage medium includes: USB drive, mobile hard disk, ROM, RAM, disk or optical disk and other media that can store program code.

Finally, it should be noted that the above embodiments are only used to illustrate the technical solution of the present disclosure and are not limited. Other modifications or equivalent replacements made by ordinary technicians in this field to the technical solution of the present disclosure should be included in the scope of the claims of the present disclosure as long as they do not deviate from the spirit and scope of the technical solution of the present disclosure.

The invention claimed is:

1. A method for assessing power system operation risk under extreme weather conditions by considering deep feature mining, comprising:

dividing an entire power system into regions based on geographical location;

constructing a correlation model for strong wind extreme weather in multiple regions of the power system based on historical wind speed data;

building a sample set of strong wind scenarios for each region based on the correlation model;

obtaining a probability of transmission line failure in the corresponding region under each strong wind scenario in the sample set of strong wind scenarios;

randomly assigning a power system operating condition to each strong wind scenario in each region, and obtaining the operating risk value of the power system under the corresponding operating condition;

constructing and training a risk assessment model;

using the risk assessment model to conduct power system operation risk assessment;

generating a power system operation risk score; and outputting the power system operation risk score.

2. The method of claim 1, further comprising: based on the assessment results of the power system operation risk score, providing auxiliary decision-making suggestions.

3. The method of claim 1, further comprising: the method for constructing and training a risk assessment model includes: obtaining the operating data of the power system assigned to each strong wind scenario in each region and the corresponding operating risk value, and constructing a training sample set with the obtained operating data, the operating risk value, and the corresponding wind speed value; constructing a risk assessment model; training the risk assessment model with the training sample set, wherein the operating data and wind speed value serve as input data, and the operating risk value of the power system serves as output data.

4. The method of claim 3, further comprising: the method for constructing a risk assessment model includes: using an extreme learning machine (ELM) to construct a risk assessment model, and taking the weighted sum of the linear kernel function (Linear), the polynomial kernel function (Poly), the radial basis function kernel function (Rbf), and the wavelet kernel function (Wav) as the final kernel function.

5. The method of claim 4, further comprising: the final kernel function K(x, y) is expressed as: K(x, y)=W1KLinear (x,y)+w2KPry)+w3KRbf(x, y)+w4KWav(x,y) KLinear(X, y)=xTYKp', =(yxTy+r)dKRbf(x,y)=exp(−yllx−y112)8 Kwav(X,y)=(x−7) wherein, KLinear(x, y) is the linear kernel function, Kpogy is the polynomial kernel function, KRbf (x, y) is the radial basis function kernel function, Kway(x, y) is the wavelet kernel function, y is a positive scaling factor, r is the bias, d is the order of the polynomial, <p is a wavelet function that satisfies certain conditions, and w1, w2, w3, w4 are the weight values of the four kernel functions respectively.

6. The method of claim 1, further comprising: the method to obtain the power system operation risk value includes: obtaining a voltage over-limit index Pu, a flow overload index Pp, a flow transfer index Pt and a load loss rate index P; obtaining the power system operation risk value=31Pu+32Pp+/33Pt+ wherein 31, #32 #34 is the importance coefficient of the corresponding indicator.

7. The method of claim 1, further comprising: the method for dividing the entire power system into regions includes: using the Fuzzy C-Means (FCM) clustering algorithm to divide the power system into regions, the objective function of the FCM algorithm is defined as J(U, M)=(i)−v; 2, wherein, R represents the number of clusters, that is, the number of regions to be divided; U represents the fuzzy matrix, which represents the membership of each node to each region; M is the cluster center matrix, which contains the center point of each region; N is the number of nodes; ui1 is the membership of node i to region j; m is the fuzziness parameter; v is the center point of region j.

8. An electronic device, comprising: a processor and a memory; the memory storing executable instructions, and the processor executing the instructions to implement the operation risk assessment method described in claim 1.

9. A device for assessing power system operation risk under extreme weather conditions by considering deep feature mining, comprising:

a data acquisition unit, a model training unit, and a risk assessment unit, wherein the data acquisition unit obtaining the network topology of the power system and dividing the entire power system into regions according to the geographical location;

constructing a correlation model of strong wind extreme weather in multiple regions of the power system in combination with the historical wind speed data;

constructing a strong wind scenario sample set for each region according to the correlation model;

obtaining the transmission line failure probability of the corresponding region under each strong wind scenario in the strong wind scenario sample set; and obtaining the operation data and operation risk value of the power system under the corresponding operation condition after randomly assigning a power system operation condition to each strong wind scenario in each region;

the model training unit constructing a training sample set and a risk assessment model, and training the risk assessment model with the training sample set;

the risk assessment unit performing an operation risk assessment on the power system using the constructed risk assessment model, generating a power system operation risk score, and outputting the operation risk score of the power system.

* * * * *